Nov. 23, 1954     O. B. GWILLAM     2,694,859
MECHANICAL CALCULATOR OF GEOGRAPHICAL POSITIONS
Filed April 15, 1952     3 Sheets-Sheet 1

Oakley B. Gwillam
INVENTOR.

Nov. 23, 1954  O. B. GWILLAM  2,694,859
MECHANICAL CALCULATOR OF GEOGRAPHICAL POSITIONS
Filed April 15, 1952  3 Sheets-Sheet 2

Oakley B. Gwillam
INVENTOR.

BY *Clarence A. O'Brien*
*and Harvey B. Jackson*
Attorneys

Nov. 23, 1954  O. B. GWILLAM  2,694,859
MECHANICAL CALCULATOR OF GEOGRAPHICAL POSITIONS
Filed April 15, 1952  3 Sheets-Sheet 3
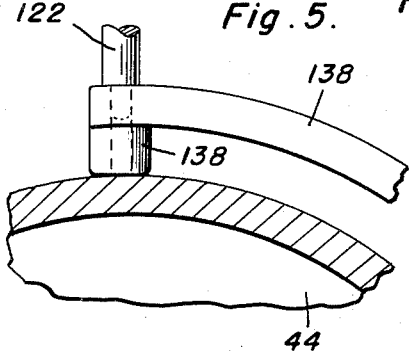
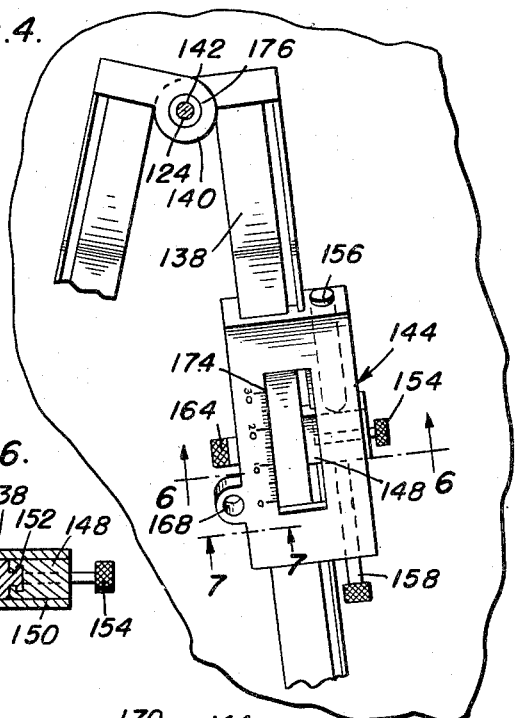
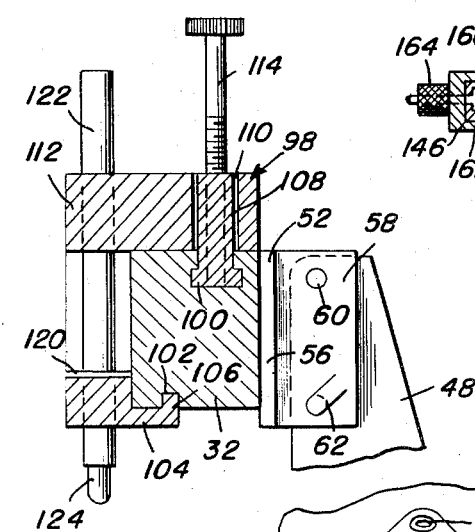
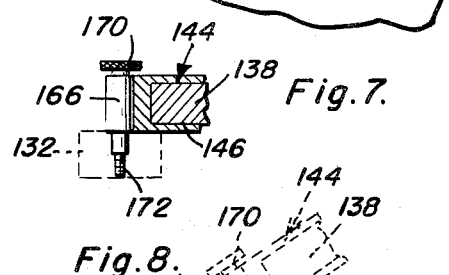
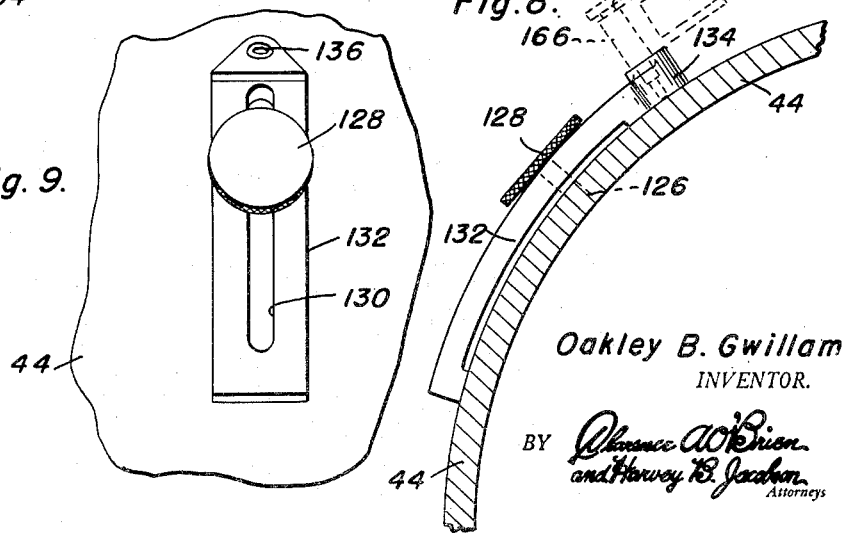
Oakley B. Gwillam
INVENTOR.

United States Patent Office 2,694,859
Patented Nov. 23, 1954

2,694,859

MECHANICAL CALCULATOR OF GEOGRAPHICAL POSITIONS

Oakley B. Gwillam, Sun Valley, Calif.

Application April 15, 1952, Serial No. 282,446

15 Claims. (Cl. 33—1)

This invention relates in general to a device for calculating geographical positions, and more specifically to a device by means of which a person may calculate his geographical position after observing two or more celestial bodies.

The primary object of this invention is to provide an improved mechanical calculator which may be utilized for determining a position on the surface of the earth after fixes have been obtained on two separate heavenly bodies, said device permitting the finding of the position without the requirement of mathematical calculations.

Another object of this invention is to provide an improved mechanical calculator for determining geographical positions from celestial observations, said mechanical calculator permitting the accurate determination of a geographical position without requiring the use of a plurality of mathematical tables and charts.

Another object of this invention is to provide an improved mechanical calculator of geographical positions from celestial observations, said mechanical calculator including means for both visually indicating a position and for indicating a position by its longitude and latitude from scales associated therewith.

A further object of this invention is to provide an improved mechanical calculator of geographical positions from celestial observations, said mechanical calculator adapted to be utilized as an instructing device and enables a student of navigation and mathematics to more clearly visualize the problem involved in computing a geographical position from celestial observations.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 4 is an enlarged fragmentary sectional view of the globe shown in Figure 1 and taken substantially upon the plane indicated by the section line 4—4 of Figure 1 and shows the manner in which a pair of arcuate members representing altitude arcs are temporarily connected together, also shown is a construction of a vernier slide mounted on one of the altitude arcs:

Figure 5 is an enlarged fragmentary transverse vertical sectional view showing the manner in which ends of the arcuate members are pivotally connected together by a pointer pin carried by the vernier slide mounted on the ring;

Figure 6 is a fragmentary transverse horizontal sectional view taken substantially upon the plane indicated by the section line 6—6 of Figure 4 and shows the general cross-section of the arcuate member and the relationship of the clamping portion of the vernier slide thereto;

Figure 7 is a fragmentary transverse horizontal sectional view taken substantially upon the plane indicated by the section line 7—7 of Figure 4 and shows the manner in which the vernier slide of the arcuate member may be connected to a spotter or clamp member selectively connected to the globe, the portion of the spotter illustrated being shown in dotted lines;

Figure 8 is an enlarged fragmentary transverse vertical sectional view showing one of the spotters clamped to the surface of the globe and having pivotally mounted in one end thereof a vernier slide on one of the arcuate members, the vernier slide being shown in dotted lines;

Figure 9 is an enlarged fragmentary view of a portion of the globe and shows a spotter clamped thereon; and Figure 10 is an enlarged fragmentary transverse vertical sectional view taken substantially upon the plane indicated by the section line 10—10 of Figure 1 and shows the general construction of the ring and the vernier slide mounted thereon.

Similar characters of reference designate similar or identical elements and portions throughout the specification and throughout the different views of the drawings.

Figure 1:
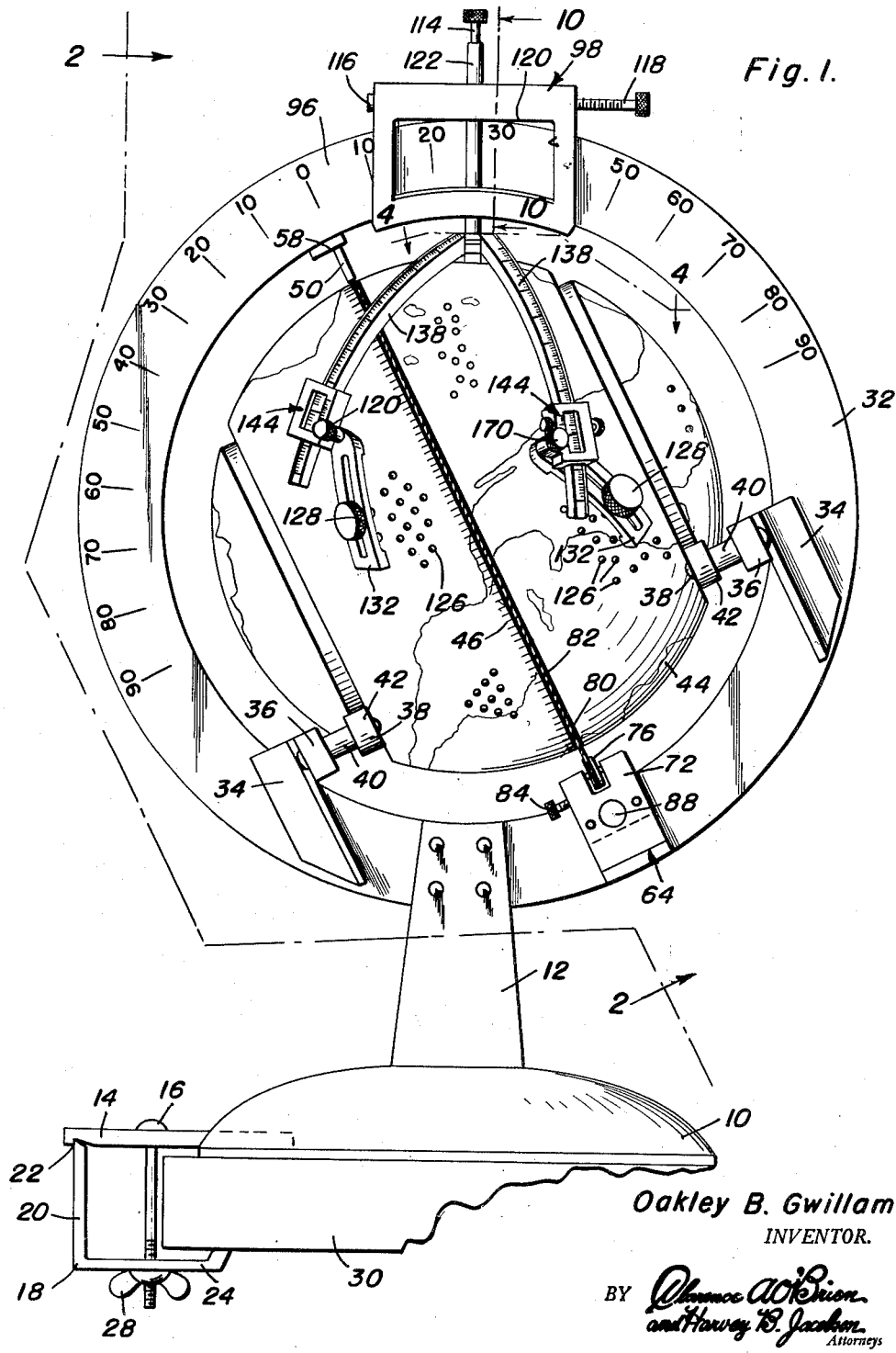
Figure 1 is a side elevational view of the mechanical calculator which is the subject of this invention and shows the same clamped to a convenient support.

Referring now to the drawings in detail, it will be seen that there is illustrated in Figure 1 a base 10 having a vertical support 12 projecting upwardly therefrom. The base 10 includes a clamp arm 14 projecting outwardly therefrom, the arm having a downwardly extending fastener 16 carried thereby. Carried by the fastener 16 adjacent the lower end thereof is an L-shaped clamp member 18 which has a vertical leg 20 whose free end engages in a groove 22 on the underside of the clamp arm 14. The clamp member 18 also has a horizontal flange 24 which receives the lower end of the fastener 16 and is engaged by wing nut 28. It will be noted that the base 10 rests on a flat support 30 and is clamped to the same through the action of the clamp elements.

Secured to the upper end of the vertical support 12 is the lower portion of a vertically extending ring 32 which represents a great circle. Carried by the ring 32 on opposite sides of the support 12 are pairs of L-shaped mounting brackets 34, the mounting brackets of each pair being mounted on opposite sides of the ring 32. One flange of each mounting bracket 34 is connected to the face of the annular ring 32 and the other flange has connected thereto a transversely extending bar 36, each bar 36 connecting together a pair of mounting brackets 34. Carried by each of the bars adjacent the ends thereof are inwardly extending rivets 38 which have mounted thereon sleeves 40 which engage the inner surface of their respective bar 36. Mounted on the rivets 38 adjacent their inner ends are rollers 42 which engage their respective sleeves 40. Mounted within the ring 32 and supported by the rollers 42 for rotation with respect to the ring 32 is a globe 44. The globe 44 is provided with a pair of circular tracks in which the rollers 42 are guided and permits the rotation of the globe 44 to be limited about an axis at an angle to both the horizontal and the vertical. Carried by the globe 44 at right angles to its axis of rotation and inscribed on the surface thereof about its circumference is a scale 46.

Figure 2:
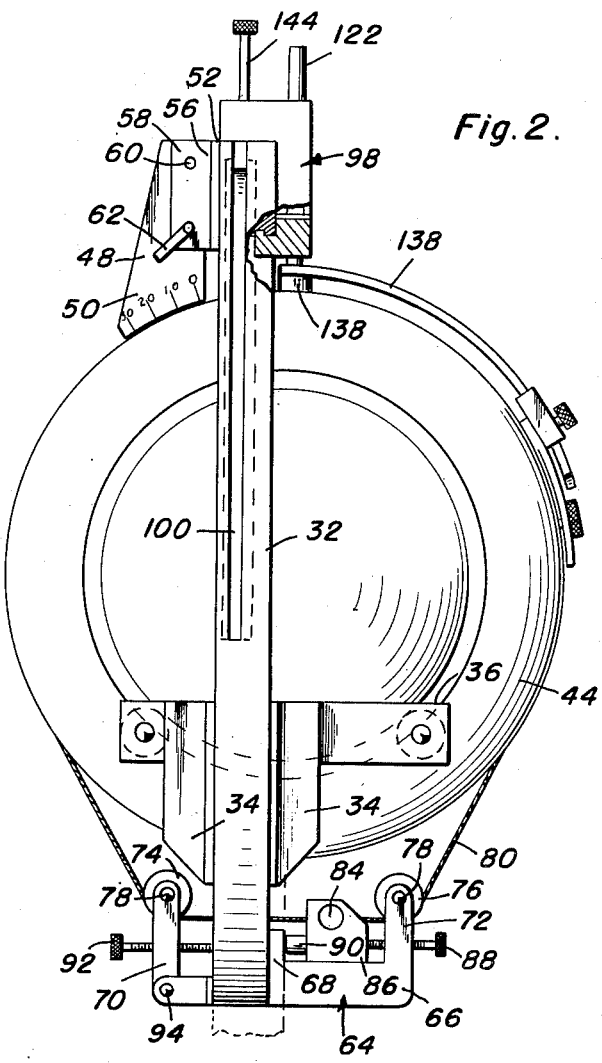
Figure 2 is a fragmentary transverse vertical sectional view taken substantially upon the plane indicated by the section line 2—2 of Figure 1 and shows the construction of means for supporting a globe within a supporting ring, a portion of the supporting ring being broken away and shown in section in order to clearly illustrate the manner in which a vernier slide is mounted thereon.
Figure 3:
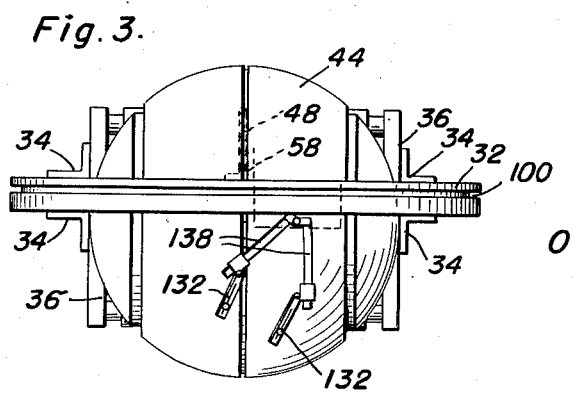
Figure 3 is a top plan view of the mechanical calculator of Figure 1 on a small scale and shows the general relationship of the support means for the globe carried by the ring.

Referring now to Figure 2 in particular, it will be seen that secured to the rear surface of the ring 32 and extending downwardly therefrom is a vernier plate 48, the vernier plate having a lower portion in alignment with the scale 46 and having a vernier scale 50 thereon adapted to be utilized in combination with the scale 46 to determine a relative position. The vernier plate 48 is secured to the ring 32 by a substantially vertically extending L-shaped mounting bracket 52. The mounting bracket 52 includes a first flange 56 which is secured to the rear surface of the ring 32 and a second flange 58 to which the vernier plate is secured for pivotal movement by a pivot pin 60. The pivoting of the vernier plate 48 permits the removal of the globe. The vernier plate 48 may be rigidly connected to the flange 58 by a removable pin 62 which prevents pivoting thereof.

Carried by the lower portion of the ring 32 in alignment with the scale 46 is a vernier mechanism, which is referred to in general by the reference numeral 64, the vernier mechanism being adapted to maintain the earth in an adjusted position with respect to the ring 32. The vernier mechanism 64 includes a generally L-shaped support 66 which has a vertically extending flange 68 secured to the front side of the annular ring 32. A portion of a horizontal arm of the L-shaped support 66 extends from the rear side of the annular ring 32 and has pivotally connected thereto a vertically extending arm 70 which is in spaced relation to an upstanding arm 72 which is a portion of the L-shaped support 66. Carried by the upper ends of the arms 70 and 72 are pulleys 74 and 76, respectively. The pulleys 74 and 76 are mounted for rotation on pins 78 carried by their respective arms and having trained thereover a flexible cable 80.

The flexible cable 80 encircles the earth 44 and is positioned within a groove 82 adjacent the scale 46. A portion of the flexible cable 80 is secured to a transversely extending pin 84 which is carried by a block 86 slidably mounted on the horizontal portion of the L-shaped support 66. The block 86 has associated therewith an adjusting screw 88 carried by the arm 72 which urges the same when turned inwardly towards the flange 68. In order that the block 86 may be urged away from the flange 68, it has projecting from the side opposite the adjusting screw 88 a spring urged plunger 90 which bears against the flange 68.

It will be understood that the globe 44 is normally permitted to rotate freely on its associated rollers 42 to any desired position. When it is desired to clamp the globe 44 against rotation with respect to the annular ring 32, an adjusting screw 92 carried by the arm 70 and having an inner end bearing against the rear of the annular ring 32 is screwed inwardly. Inward movement of the adjusting screw 92 results in the pivoting of the arm 70 about its pivot pin 94 with the result that its associated pulley 74 is moved away from the pulley 76 and the flexible cable 80 is tensioned. The tensioning of the flexible cable 80 results in the friction engagement thereof with the globe 44 so as to prevent rotation thereof. The globe 44 then may be moved to the desired position through movement obtainable by the block 86 and its associated adjusting screw 88.

In order that the annular ring 32 may be utilized in determining a geographical position, it is provided with a scale 96 on the upper portion thereof, the scale 96 having a zero mark in alignment with the upper portion of a great circle perpendicular to the axis of rotation of the globe 44 and extends therefrom at an angle of 90° thereto. In order that the scale 96 may be utilized, the annular ring 32 has mounted thereon a vernier slide which is referred to in general by the reference numeral 98. Referring now to Figures 1 and 10, it will be seen that the annular ring 32 is provided with an inverted T-shaped groove 100 positioned in the upper portion thereof adjacent the scale 96 and opening through the outer surface thereof. The inner surface of the annular ring 32 is also provided with a generally rectangular groove 102 in the lower surface thereof. The vernier slide 98 is generally C-shaped and has a lower flange 104 which underlies the inner surface of the annular ring 32 and terminates in an upwardly extending projection 106 which is received within the groove 102 and prevents removal of the vernier slide 98 from the annular ring 32.

In order that a minute movement of the vernier slide 98 with respect to the annular ring 32 may be obtained, the vernier slide 98 includes an elongated inverted T-shaped portion 108 whose lower end is mounted in the T-shaped groove 100 and whose upper portion is mounted within a longitudinally extending groove 110 in the upper flange 112 of the vernier slide 98. Extending vertically through the T-shaped portion 108 is a locking screw 114 whose lower end is threadedly engaged within a threaded bore through the T-shaped portion 108 with the lower end of the locking screw 114 engaging the annular ring 32 at the bottom of the T-shaped groove 100. Mounted at one end of the groove 110 is a spring urged plunger 116 which urges the T-shaped portion 108 towards the other end of the groove 110. Movement of the T-shaped portion 108 by the spring urged plunger 116 is prevented by an adjusting screw 118 carried by the vernier slide 98 at the other end of the groove 110 for shifting the T-shaped portion therein.

Referring now to Figure 1 in particular, it will be seen that the forward side or web of the C-shaped vernier slide 98 is provided with a window 120 through which the scale 96 on the annular ring 32, may be read. Extending vertically and carried by the flanges 104 and 112 is a positioning pin 122 which passes through the center of the window 120. The positioning pin 122 is provided with a reduced lower end 124 which is adapted to be received within a socket. It will be understood that the reduced lower end 124 of the pin 122 also forms a pointer and indicates a position on the surface of the globe 44.

The surface of the globe 44 is provided with a plurality of radially extending internally threaded apertures 126 which are adapted to receive the threaded lower end of a clamping screw 128. The upper portion of the stem of the clamping screw 128, as best illustrated in Figures 8 and 9, is slidably mounted in an elongated slot 130 in an elongated arcuate clamp member or spotter 132. The spotter 132 is provided with an enlarged end portion 134 having a radially extending bore 136 therein, the bore 136 adapted to receive the reduced lower end 124 of the pin 122 in order to position the spotter 132 on the globe 44.

It will be understood that there are two such spotters 132 and each of the spotters has associated therewith an arcuate member forming an altitude arc 138. One end of the altitude arc 138 is cut off square and the other end thereof is provided with an offset enlargment 140 which is provided with a centrally located bore 142 which is adapted to receive the reduced lower end 124 of the pin 122. It will be understood that the enlarged portions 140 of the altitude arcs 138 overlap and are pivotally connected together by a tubular pivot pin 176 disposed within their bores 142 whereby the enlarged portions 140 of the altitude arcs 138 are only one-half of the thickness of the altitude arcs and are in overlying relation.

Mounted on each altitude arc 138 is a vernier connecting member, which is referred to in general by the reference numeral 144. The vernier connecting member 144 is generally rectangular in outline and has extending longitudinally therethrough an opening conforming to the general cross-section of the altitude arc 138, the altitude arc being generally rectangular and having a T-shaped portion along one edge thereof. The groove through the connecting member 144 is referred to by the reference numeral 146 and permits free but guided movement of the connecting member 144 along its associated altitude arc 138.

In order that the connecting member 144 may be adjustably clamped to its associated altitude arc 138, it is provided with a movable portion 148 slidably mounted in a longitudinally extending groove 150 in the connecting member 144, said groove 150 opening through one edge thereof. The movable portion 148 is provided with a T-shaped slot 152 receiving the T-shaped edge of the altitude arc 138 and is retained within its associated groove 150 thereby. The movable member 148 is provided with a locking screw 154 which is adapted to engage the altitude arc 138 and prevent movement thereof with respect to the connecting member 144. Carried by the connecting member 144 and extending into one end of the groove 150 is a spring urged plunger 156 which urges the movable member 148 towards an adjusting screw 158 which projects inwardly into the groove 150 from the other end thereof.

In order that the connecting member 144 may be rigidly connected to the associated altitude arc 138 after it has been adjustably positioned thereon, the side thereof opposite from the side having the grove 150 opening therethrough is provided with a T-headed fastened 160. The T-head of T-headed fastener 160 is movably positioned within a T-shaped groove 162 in the edge of the altitude arc 138 opposite from the T-shaped edge portion. Threadedly engaged on the outer end of the T-head fastener 160 is a nut 164 which clamps the altitude arc 138 against the side of the opening 146 therethrough adjacent the edge of the altitude arc 138 in which the T-shaped groove 162 is formed.

Referring now to Figures 1 and 7 in particular, it will be seen that positioned on the inner edge of the connecting member 144 adjacent the lower end thereof is a projection 166. The projection 166 is provided with a radially extending bore 168 in which is received a fastener 170. The fastener 170 has an end portion corresponding to the general shape of the end portion of the pin 122 with the reduced end 172 thereof being threaded and adapted to be threadedly engaged in the lower portion of the bore 136 in one of the spotters 132.

Referring once again to Figure 4 in particular, it is seen that the connecting member 144 has formed in the outer face thereof a window 174. The window 174 may be utilized for reading a scale (not shown) formed on the outer surface of its associated altitude arc 138 whereby the connecting member 144 may be positioned by utilizing the scale (not shown).

In order to utilize the present device for calculating a geographical position, observations are made on two selected separated heavenly bodies by conventional methods using a sextant or transit. For the purpose of explanation, it will be assumed that the heavenly bodies are stars X and Y. In taking the observations, the altitude (angle of elevation) of star X is taken and the exact time is recorded. The altitude is corrected for refraction of the atmosphere and from a nautical or American Air Almanac the Greenwich Hour Angle and declination of star X are obtained. The Greenwich Hour Angle is then set on the device by rotating the globe 44 until the desired position is indicated by the vernier plate 50, it being understood that the vernier mechanism 64 is utilized in positioning the globe 44. Then the vernier slide 98 is moved along the annular ring 32 to the declination of the star X. It will be understood if sidereal time is used, then the star X's right ascension and declination are set on the scales.

After the globe 44 and the vernier slide 98 have been properly positioned for the recordings of the star X, a first spotter 132 has the reduced lower end 124 of the pin 122 inserted in the bore 136 of the spotter and the spotter is clamped to the surface of the globe 44 by threadedly engaging its clamp screw 128 in one of the plurality of apertures in the globe 44.

After the spotter 132 for the star X has been properly positioned, the process is repeated for the star Y with its associated spotter 132 being properly positioned. Then the connecting member 144 of one of the altitude arcs 138 is positioned on its respective altitude arc at an arc equal to the observed altitude of the star X, and the connecting member 144 on the other altitude arc 138 is set according to the observed altitude of the star Y.

After the connecting members 144 of the altitude arcs 138 have been properly adjusted, their respective fasteners 170 are threadedly engaged in the bores 136 of their respective spotters 132. The center of the bores 142 in the ends of the altitude arcs 138 are thereby positioned directly above the observer's position on the earth 44. If the desired latitude and longitude of the observer are desired, the globe 44 and the vernier slide 98 are moved until the pin 122 has its reduced lower end 124 positioned within the bores 142. It will be understood that the vertical arcs 138 are pivotally connected together by a tubular pivot pin 176 which axially receives the reduced lower end 124 of the pin 122, and that the pin 122 is vertically movable within the vernier slide 98 to permit the entrance and removal of the same with respect to the bores 142 and 136. After the globe 44 and the vernier slide 98 have been moved so that the pin 122 has its lower reduced end 124 engaged within the bores 142, the observer's longitude may be read directly from the scale 46 by utilizing the vernier plate 48 and the observer's latitude may be read directly from the scale 96 by utilizing the vernier slide 98.

While the spotters 132 have been illustrated and described as being connected to the globe 44 by clamp screws 128, it will be understood that if desired the globe 44 may be formed of a magnet attractive material and the spotters 132 be formed of magnets.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A fix finder comprising a ring, a surface rotatable with respect to said ring, means carried by said ring associated with said surface to indicate a position on the earth's surface, said means including a pointer, said pointer being carried by a vernier slide mounted on said ring, clamp elements associated with said pointer for forming locating points on said surface, said clamp elements being removably secured to said surface.

2. A fix finder comprising a ring, a surface rotatable with respect to said ring, means carried by said ring associated with said surface to indicate a position on the earth's surface, said means including a pointer, said pointer being carried by a vernier slide mounted on said ring, clamp elements associated with said pointer for forming locating points on said surface, said clamp elements being removably secured to said surface, arcuate members connected to said clamp elements at said locating points, said arcuate members forming altitude arcs for heavenly bodies.

3. A fix finder comprising a ring, a surface rotatable with respect to said ring, means carried by said ring associated with said surface to indicate a position on the earth's surface, said means including a pointer, said pointer being carried by a vernier slide mounted on said ring, clamp elements associated with said pointer for forming locating points on said surface, said clamp elements being removably secured to said surface, arcuate members, said arcuate members forming altitude arcs for heavenly bodies, adjustable connecting means carried by said clamp elements connecting said clamp elements to said arcuate members at said locating points.

4. A fix finder comprising a ring having graduations thereon, said ring representing a great circle, a surface mounted within said ring for rotation with respect thereto, a scale on said surface for indicating the relationship of said surface with respect to said ring, means on said ring for indicating a specific position on said surface, said position also being indicated by said graduations and scale, removable clamp elements selectively secured to said surface, said clamp elements having position indicating sockets cooperating with said means and positioned thereby.

5. A fix finder comprising a ring having graduations thereon, said ring representing a great circle, a surface mounted within said ring for rotation with respect thereto, a scale on said surface for indicating the relationship of said surface with respect to said ring, means on said ring for indicating a specific position on said surface, said position also being indicated by said graduations and scale, removable clamp elements selectively secured to said surface, said clamp elements having position indicating sockets cooperating with said means and positioned thereby, said clamp elements having fasteners selectively threadable within threaded bores in said surface.

6. A fix finder comprising a ring having graduations thereon, said ring representing a great circle, a surface mounted within said ring for rotation with respect thereto, a scale on said surface for indicating the relationship of said surface with respect to said ring, means on said ring for indicating a specific position on said surface, said position also being indicated by said graduations and scale, removable clamp elements selectively secured to said surface, said clamp elements having position indicating sockets cooperating with said means and positioned thereby, arcuate members connected to said clamp elements at said position indicating sockets, said arcuate members forming altitude arcs for heavenly bodies.

7. A fix finder comprising a ring having graduations thereon, said ring representing a great circle, a surface mounted within said ring for rotation with respect thereto, a scale on said surface for indicating the relationship of said surface with respect to said ring, means on said ring for indicating a specific position on said surface, said position also being indicated by said graduations and scale, removable clamp elements selectively secured to said surface, said clamp elements having position indicating sockets cooperating with said means and positioned thereby, arcuate members connected to said clamp elements at said position indicating sockets, said arcuate members forming altitude arcs for heavenly bodies, adjustable connecting means carried by said clamp elements connecting said clamp elements to said arcuate members.

8. A fix finder comprising a ring having graduations thereon, said ring representing a great circle, a surface mounted within said ring for rotation with respect thereto, a scale on said surface for indicating the relationship of said surface with respect to said ring, means on said ring for indicating a specific position on said surface, said position also being indicated by said graduations and scale, removable clamp elements selectively secured to said surface, said clamp elements having position indicating sockets cooperating with said means and positioned thereby, said surface being positioned with respect to said ring by clamp means, said clamp means being provided with a vernier adjustment.

9. A fix finder comprising a ring having graduations thereon, said ring representing a great circle, a surface mounted within said ring for rotation with respect thereto, a scale on said surface for indicating the relationship of said surface with respect to said ring, means on said ring for indicating a specific position on said surface, said position also being indicated by said graduations and scale, removable clamp elements selectively secured to said surface, said clamp elements having position indicating sockets cooperating with said means and positioned thereby, said surface being positioned with respect to said ring by clamp means, said clamp means being provided with a vernier adjustment, said clamp means comprising a cable carried by said ring and having friction engagement with said surface.

10. A mechanical calculator of geographical positions from celestial observations comprising a supporting ring, a globe carried by said ring for rotation with respect to said ring, a scale carried by said globe for indicating the longitudes of positions, a scale carried by said ring for indicating latitudes of positions, means on said ring for indicating a specific position on the surface of the globe, said position also being indicated by said scales, removable clamp elements selectively secured to the surface of the globe, said clamp elements having position indicating sockets cooperating with said means and positioned thereby.

11. A mechanical calculator of geographical positions from celestial observations comprising a supporting ring, a globe carried by said ring for rotation with respect to said ring, a scale carried by said globe for indicating the longitudes of positions, a scale carried by said ring for indicating latitudes of positions, means on said ring for indicating a specific position on the surface of the globe, said position also being indicate by said scales, removable clamp elements selectively secured to the surface of the globe, said clamp elements having position indicating sockets cooperating with said means and positioned thereby, arcuate members connected to said clamp elements at said position indicating sockets, said arcuate members forming altitude arcs for heavenly bodies.

12. A mechanical calculator of geographical positions from celestial observations comprising a supporting ring, a globe carried by said ring for rotation with respect to said ring, a scale carried by said globe for indicating the longitudes of positions, a scale carried by said ring for indicating latitudes of positions, means on said ring for indicating a specific position on the surface of the globe, said position also being indicated by said scales, removable clamp elements selectively secured to the surface of the globe, said clamp elements having position indicating sockets cooperating with said means and positioned thereby, arcuate members connected to said clamp elements at said position indicating sockets, said arcuate members forming altitude arcs for heavenly bodies, adjustable connecting means carried by said clamp elements connecting said clamp elements to said arcuate members.

13. A mechanical calculator of geographical positions from celestial observations comprising a supporting ring, a globe carried by said ring for rotation with respect to said ring, a scale carried by said globe for indicating the longitudes of positions, a scale carried by said ring for indicating latitudes of positions, means on said ring for indicating a specific position on the surface of the globe, said position also being indicated by said scales, removable clamp elements selectively secured to the surface of the globe, said clamp elements having position indicating sockets cooperating with said means and positioned thereby, said surface being positioned with respect to said ring by clamp means, said clamp means being provided with a venier adjustment.

14. A mechanical calculator of geographical positions from celestial observations comprising a supporting ring, a globe carried by said ring for rotation with respect to said ring, a scale carried by said globe for indicating the longitudes of positions, a scale carried by said ring for indicating latitudes of positions, means on said ring for indicating a specific position on the surface of the globe, said position also being indicated by said scales, removable clamp elements selectively secured to the surface of the globe, said clamp elements having position indicating sockets cooperating with said means and positioned thereby, said surface being positioned with respect to said ring by clamp means, said clamp means comprising a cable carried by said ring and having friction engagement with said surface.

15. A mechanical calculator of geographical positions from celestial observations comprising a supporting ring, a globe carried by said ring for rotation with respect to said ring, a scale carried by said globe for indicating the longitudes of the positions, a scale carried by said ring for indicating latitudes of positions, means on said ring for indicating a specific position on the surface of the globe, said position also being indicated by said scales, removable clamp elements selectively secured to the surface of the globe, said clamp elements having position indicating sockets cooperating with said means and positioned thereby, said means including a pointer, said pointer being carried by a vernier slide mounted on said ring.

References Cited in the file of this patent

UNITED STATES PATENTS

| Number | Name | Date |
|---|---|---|
| 2,374,788 | Steele | May 1, 1945 |
| 2,403,920 | Hagner | July 16, 1946 |

FOREIGN PATENTS

| Number | Country | Date |
|---|---|---|
| 946 | Great Britain | Apr. 3, 1866 |
| 2,457 | Great Britain | May 24, 1882 |